US010670754B2

(12) United States Patent
Lindgaard et al.

(10) Patent No.: US 10,670,754 B2
(45) Date of Patent: Jun. 2, 2020

(54) SYSTEM AND METHOD FOR PROCESSING MICROSEISMIC DATA

(71) Applicant: OCTIO AS, Bergen (NO)

(72) Inventors: John Even Lindgaard, Harstad (NO); Remy Agersborg, Bergen (NO); Tatiana Matveeva, Laksevaag (NO)

(73) Assignee: OCTIO AS, Bergen (NO)

( * ) Notice: Subject to any disclaimer, the term of this patent is extended or adjusted under 35 U.S.C. 154(b) by 5 days.

(21) Appl. No.: 15/108,806

(22) PCT Filed: Dec. 19, 2014

(86) PCT No.: PCT/NO2014/050249
§ 371 (c)(1),
(2) Date: Jun. 29, 2016

(87) PCT Pub. No.: WO2015/102498
PCT Pub. Date: Jul. 9, 2015

(65) Prior Publication Data
US 2016/0320504 A1   Nov. 3, 2016

(30) Foreign Application Priority Data

Jan. 3, 2014   (NO) .................................. 20140008

(51) Int. Cl.
*G01V 1/30* (2006.01)
*G01V 1/28* (2006.01)

(52) U.S. Cl.
CPC ................ *G01V 1/30* (2013.01); *G01V 1/282* (2013.01); *G01V 1/288* (2013.01); *G01V 2210/123* (2013.01)

(58) Field of Classification Search
CPC .......... G01V 1/30; G01V 1/282; G01V 1/288; G01V 2210/123
See application file for complete search history.

(56) References Cited

U.S. PATENT DOCUMENTS 7,676,349 B2 *   3/2010  Xu ........................ G01V 99/00
                                                    703/2
9,047,513 B2 *   6/2015  Derzhi ............... G06K 9/00624
(Continued)

FOREIGN PATENT DOCUMENTS

WO   2010/080366   7/2010
WO   2013/119598   8/2013

OTHER PUBLICATIONS

International Search Report issued in PCT/NO2014/050249, dated Mar. 26, 2015, pp. 1-2.

*Primary Examiner* — Krystine E Breier
(74) *Attorney, Agent, or Firm* — Jeffrey S. Melcher; Melcher Patent Law PLLC

(57) ABSTRACT

A system (400) for processing microseismic data comprises an array (330) of seismic sensors (331, 332) at known locations, means (331, 332; 410) for enhancing SNR in a seismic signal output from a seismic sensor, means (331, 332; 410) for detecting a microseismic event in the seismic signal and inverting means (410) for adapting a rock physical model (255) to microseismic data that are acquired at least partially from the seismic signal representing a microseismic event. The rock physical model comprises a set of spatial volume elements mapping a set of physical volume elements (320) within a volume (300) to be monitored, wherein each spatial volume element comprises attributes for the position and extension of the physical volume element (320), a velocity and an attenuation. Data of various kinds, e.g. pore geometry, and from numerous sources, e.g. laboratory measurements, can be incorporated in the rock physical model (255).

13 Claims, 7 Drawing Sheets

(56) References Cited

U.S. PATENT DOCUMENTS

| | | | |
|---|---|---|---|
| 9,405,026 B2* | 8/2016 | Toms | G01V 1/306 |
| 9,482,771 B2* | 11/2016 | Zhang | G01V 1/306 |
| 10,261,215 B2* | 4/2019 | Miotti | G01V 11/002 |
| 2013/0013209 A1* | 1/2013 | Zhu | G01N 33/24 702/6 |
| 2013/0215717 A1* | 8/2013 | Hofland | G01V 1/306 367/59 |
| 2016/0070013 A1* | 3/2016 | Meunier | G01V 1/32 702/18 |
| 2016/0222741 A1* | 8/2016 | Lovorn | E21B 47/06 |
| 2017/0205531 A1* | 7/2017 | Berard | G01V 11/00 |

* cited by examiner

SYSTEM AND METHOD FOR PROCESSING MICROSEISMIC DATA

BACKGROUND

Field of the Invention

The present invention relates to a method for processing microseismic data, here defined as data representing seismic signals from microseismic events that are caused by changes in stress in an underground formation. Analyzed microseismic data may provide detailed information that is useful in numerous applications, for example monitoring a hydrocarbon reservoir during completion and production; similar monitoring of a geothermal site; monitoring large structures such as a dam or a land fill etc. The present invention is not limited to any particular application, but concerns processing of microseismic data as such.

Prior and Related Art

The present invention will be described with reference to an oil or gas reservoir within a layered rock formation, because this context may comprise an anisotropic formation, fractures induced by hydraulic fracturing, stress changes due to pumping and/or injection, one or more wellbores and other features that may be relevant in conjunction with the invention. However, it should be clearly understood that the present invention is applicable to other areas of interest.

A conventional seismic survey is generally performed by setting off a powerful seismic source that provides acoustic energy sufficiently powerful to penetrate to a desired depth in a subterranean formation. The source wave components are reflected and refracted from interfaces in the formation, and the resulting P- and S-waves are typically detected by seismic sensors arranged in known positions in a sensor array. A velocity model comprises data on propagation velocities within the volume. If the propagating velocities are known, a distance of propagation is readily calculated from a measured travel time from the shot to the point in time a P-wave or S-wave arrives at the sensor. A map of the subterranean formation may then be computed from known positions of the seismic receivers and the computed distances.

In passive microseismic monitoring, the sources are so-called microseismic events, which are caused by changes in stress within the formation. As there is no clear time interval between a microseismic event and an arrival time, distances need to be computed in a different manner. Techniques may be found in the field of analyzing earthquakes, which mathematically resemble microseismic monitoring except for the magnitudes of the seismic source and the radiation pattern of emitted energy.

Microseismic monitoring is a relative new technology to the oil and gas industry, but has been a well establish method for monitoring fracture networks in geothermal field from the early 1970s (Maxwell et. al. 2010). The technique is currently being used in conjunction with reservoir stimulation, monitoring stress changes and crack development in the reservoirs.

In order to better understand the context of the present invention, reference is made to FIGS. 1 and 2, both representing prior art.

FIG. 1 is compiled from Agersborg et al. (2007), and shows an example of a velocity model in which velocities for P-waves and S-waves depend on frequency (f) and effective pressure (p). In the FIGS. 1a-d an f-p plane is shown with frequencies in the range 0-1 kHz (on a logarithmic scale) and effective pressures in the range 0-20 MPa. Points on any of the depicted plots may be regarded as a triplet of corresponding values, e.g. (f, p, v), or as a function of two independent variable, e.g. v(f, p). The two representations are equivalent.

FIG. 1a illustrates a velocity of a P-wave, $v_P$, as a function of frequency f and effective pressure p. At pressures below about 10 MPa, $v_P$ increases from about 3900 m/s with increasing frequencies, whereas the velocity $v_P$ is nearly independent of frequency at an effective pressure of 20 MPa. The frequency dependency is highly dependent on the pore geometry of the rock.

FIG. 1b is a plot of $1/Q_P$ over the same frequency-pressure plane as in FIG. 1a. Here, $Q_P$ is the Q-value for a P-wave, i.e. a dimensionless parameter that compares the time decay of the amplitude of the P-wave to its period. Hence, the parameter $1/Q$ is a measure for attenuation, and will be called "attenuation" in this disclosure.

Amplitude and period of a seismic signal are conveniently measured at an acoustic receiver, at least in principle, and the attenuation $1/Q$ may be derived from these variables in a straightforward manner. In the example shown in FIG. 1b, the attenuation for P-waves, $1/Q_P$, depends strongly on both frequency and effective pressure. As $1/Q_P$ is less than about 0.05, $Q_P$ is over 20. Thus, the plot on FIG. 1b represents an under damped system similar to a second order low-pass filter, such that a seismic impulse would be received as a P-wave with a fairly large first amplitude followed by gradually smaller amplitudes and within a few cycles stabilize close to a steady state value. Conversely, analyzing the P-waves and referring to a plot such as the one on FIG. 1b may provide information on effective density once the velocity and frequency are known.

FIG. 1c is a plot of the velocity $v_S$ of an S-wave over the same frequency-pressure plane as in the FIGS. 1a and 1b. In this example, the velocity $v_S$ of the secondary or shear wave hardly varies with frequencies in the interval 0-1 kHz at any constant pressure, but depends strongly on the effective pressure. As shown in FIG. 1c, the velocity $v_S$ at any frequency in the illustrated range increases from about 1820 m/s with effective pressure up to about 15 MPa, where the shear wave velocity suddenly increases from about 1920 m/s to about 2150 m/s. The velocities $v_S$ for the secondary waves are less than about half the velocities $v_P$ of the primary waves. Thus, the difference $V_P - V_S$ provides a difference in arrival times of the P-waves and S-waves that can be used to estimate a distance from a microseismic event to a receiver, especially if frequency and effective pressure are estimated and/or measured.

FIG. 1d shows a plot of $1/Q_S$ over the same f-p plane as in the previous figures. Low values of $1/Q_S$ over the entire plane indicate high $Q_S$, i.e. low energy loss. However, internal reflections and refraction in a signal with low energy loss means that much of the emitted acoustic energy appears at the receiver as noise.

While plots such as those on FIGS. 1a and 1c may provide information on any variable f, p or v if only two of the variables are known, the results may appear ambiguous. For example, the plot in FIG. 1a shows several points (f, p) with the same value of velocity v. However, it is understood that even small heterogeneities will have an effect on the overall properties (effective properties of the rock), and may affect the acoustic velocities differently in different directions.

Some of the above shortcomings are alleviated by techniques from prior art. FIG. 2 shows major steps in a typical method for microseismic monitoring using some of these techniques:

The process 200 starts in step 210, which may contain any initialization and/or calibration.

In step 220, raw seismic signals representing P-waves and S-waves are acquired, typically by a seismic node comprising several three component receivers and a control unit. In microseismic monitoring, the acquisition of seismic signals is a continuous process. However, large portions of the collected data, for example noise, may be discarded by primary signal processing as further explained below. The seismic receivers or sensors may comprise any known sensors that are capable of detecting seismic P-waves and S-waves, e.g. hydrophones, geophones, accelerometers, tiltmeters etc. As well known in the art, S-waves do not propagate through fluids because a fluid does not convey shear forces. Thus, detectors for S-waves must be acoustically coupled to the ground by a solid member. Otherwise, the sensors may be deployed as suitable for the implementation at hand. Thus, sensors may be deployed on the surface of the formation, i.e. at the interface between the ground and the air or water above, and/or within wellbores or boreholes extending into the formation. As an example, WO 2012/136951A2 discloses a sensor array in which an optical fiber is disposed in solid contact with the formation within the cemented annulus of a wellbore. A laser pulsed at, for example, 20 kHz, emits light into the fiber, and the backscatter is detected in time windows corresponding to different locations along the fiber. Elastic deformation caused by a microseismic event is detected based on Rayleigh backscatter. The seismic sensors or arrays as such are not part of the invention, and thus not described in greater detail herein.

In step 230, noise is suppressed and discarded. This step may be performed locally in a seismic node by a control unit capable of primary signal processing. Alternatively, the control unit may be configured to transmit the raw signal to a central processor for primary signal processing. In either case, the purpose of step 130 is to enhance the signal-to-noise ratio (SNR). Algorithms for this will be known to the skilled person, and may include, for example, a frequency band pass filter, FK-filter, dip filter etc., each of which may be implemented by analog or digital circuits or by computational methods performed by a processor within a computer.

In step 240, the aim is to detect a seismic event within a continuous stream of seismic data, preferably in real time. As in step 230, the required signal processing may be carried out by the control unit in each seismic node, or by a remote central processor. The so-called Short Time Averaging over Long Time Averaging (STA/LTA) algorithm may serve as an example of a trigger algorithm suitable for this purpose. STA/LTA continuously calculates average values of the absolute amplitude of a seismic signal in a short time window (STA) and in a long term window (LTA). STA is sensitive to seismic events, while LTA provides information about the temporal amplitude of seismic noise at the site. Thus, a microseismic event is indicated by a large ratio STA/LTA, and recording may be triggered whenever the ratio STA/LTA exceeds a preset threshold.

The exemplary steps 230 and 240 may be combined. For example, some algorithms use statistical methods to enhance the SNR and to identify perturbations that indicate microseismic events. As statistical methods require input from several nodes in a seismic array, the corresponding algorithms are run on a central computer. Using such algorithms, the SNR may be increased from, e.g. 0.8 to 1.8.

In step 250, the location of a microseismic event is determined. Step 250 requires input from several nodes, and is thus run on a central processor. To determine the location of a microseismic event, one or more of the following three different approaches are typically used (Maxwell et. al. 2010):

1. Hodogram technique utilizing particle motion of P- and/or S-wave arrivals. Location is determined from difference in arrival times of P- and S-waves to the sensors (Albright and Hanold, 1978);
2. Triangulation scheme of multiple stations and the arrival times of P- and S-waves (Gibwicz and Kijko, 1994); and
3. Semblance technique which involves finding a point in space that maximizes a semblance measure of arrival for specific phase without the need for measuring the discrete arrival time (Drew et al., 2005; Rentsh et ak., 2007 Maxwell et al. 2010).

A review of the state of the art methodology of reservoir characterization using microseismic monitoring can be found in Duncan and Eisner (2010). A brief description of cross correlation and semblance may also be found in WO 2012/136951 A2 mentioned above, cf. in particular paragraphs [0045]-[0048].

As noted, there are no clearly defined shots in passive microseismic monitoring, and hence no time interval can be determined as the difference between a shot and an arrival time. The time of a microseismic event is not known (defined) and hence exact travel time cannot be determined. This leads to an event-time versus event-depth interdependence that can produce ambiguity in the source location in the presence of noise (Duncan and Eisner; 2010). In practice, trial solutions must be made for different combinations of event-origin and event-depth. The uncertainties in location are driven by errors in the velocity model and by the bandwidth over which a useful signal can be extracted from the noise (Duncan and Eisner; 2010). The bandwidth is, similar to in onshore seismic techniques, usually 10-60 Hz. Eisner et al. (2009). Duncan and Eisner (2010) reports that error of location in the horizontal direction has a standard deviation of 3-10 m and 17-42 m in the vertical direction from an onshore case study. With a successful depth calibration, the mean error in correct depth location to the calibration points is usually less than 15 m (Duncan and Eisner; 2010). With 3-C geophones, data comprising the S-wave can reduce the uncertainties. As noted above, proper acoustic coupling through a solid is required to obtain valid and useful signals representing the S-waves.

A significant source of location uncertainty originates from the unknown subsurface velocity structure between the source and receivers, and the horizontal and vertical location errors are approximately proportionally to the velocity errors (Eisner et al. 2009). Chambers et al. (2009) report sensitivity of source location to uncertainties in the velocity model when a perturbation of ±5% to a 3D velocity model to cause static shift in the located source depth of ±150 meters in their synthetic example. When a homogeneous velocity model was used a reduction of approximate 70% in the focusing power of the migration was produced and horizontal and vertical errors of 20-65 meters and 160 meters, respectively (Chambers et al., 2010). Jansky et al. (2013) were able to reduce the location errors to 5 m or less for their synthetic configuration and concluded in their study that for a good velocity model, the source depth location accuracy can be significantly improved if used together with data from surface receivers and receivers in vertical or horizontal wells.

Thus, for establishing a reliable spatial location, a good velocity model 255 is required. The actual choice of velocity model in microseismic event location may depend on which type of information that is available, and how well the model succeeds in locating calibration shots. The velocity model 255 may comprise, for example, phase and/or group velocities for P-waves and S-waves, Q-factors, attenuation parameters, density models etc. The velocities depend on frequency and pressure as in FIG. 1 (from Agersborg et al., 2007), and is typically built from seismic data, well log data, vertical-seismic profiling data or lab measurements. The velocity model may be calibrated by, for example, adjusting its parameters such that a computed output location matches the known location at which the calibration shot in the wellbore was fired.

Travel-time tables may aid in localization in step 250. These are tables of travel times for selected waves, e.g. P-waves, S-waves or surface waves, from each of a set of points in the monitored volume to each receiver in the sensor array. The travel times are computed from the velocity model using methods known to the skilled person, such as ray-tracing or full-waveform modeling.

In step 260, the magnitude and source mechanism behind the microseismic event is determined. For this, the so-called seismic moment tensor is commonly used to represent the seismic event, and output data may include a value indicating a magnitude of an explosion or implosion (in the sense of the terms as used in the field), the direction of a fault plane and the direction of displacement. A description of the relevant mathematics can be found in US patent application US 2013246023 A1 and references cited therein. The patent application also proposes a decomposition of the seismic moment tensor, and a graphical representation of the events as graphical objects called "glyphs" disposed within the monitored spatial volume. Each glyph comprises a sphere with its center at the epicenter of the corresponding microseismic event. The size of the sphere represents the magnitude of the corresponding event, and its color may indicate whether the event was an explosion or implosion. A disc around the sphere represents direction and magnitude of a fault plane, and an arrow through the sphere indicates the direction and magnitude of the displacement. The discs and arrows make the glyphs appear tilted with respect to each other.

For clarity and completeness, it is noted that the terms "velocity model", "travel-time table" and similar terms referring to physical quantities, should not be interpreted naively as a "database of velocities", "a table of times" or the like. As well known in the art, any suitable representation having a transform and an inverse transform might be employed in the model or calculations. However, any results presented to a human for interpretation should preferably represent physically meaningful quantities to facilitate the interpretation. For example, a time sample might be Fourier transformed to a frequency spectrum and form part of a k-ω representation, or further transformed to e.g. an eigenvalue representation in some convenient linear space without any clear physical meaning. Regardless of representation, results from the calculations would preferably be transformed back, partially or fully, to be presented as physically meaningful entities, for example a frequency spectrum or a point in space-time.

The method ends in step 270, which may include presenting the results in a suitable manner.

The main objective of the present invention is to provide a system and a method that provide an improved matching of a microseismic event to observed data.

A further objective is to provide an interface between the invention and a human operator with physically meaningful entities.

SUMMARY OF THE INVENTION

These objectives are met by the system and the method of described herein below.

In a first aspect, the invention provides a system for processing microseismic data, comprising: an array of seismic sensors at known locations, means for enhancing SNR in a seismic signal output from a seismic sensor, means for detecting a microseismic event in the seismic signal and inverting means for adapting a model to microseismic data that are acquired at least partially from the seismic signal representing a microseismic event. The model is a rock physical model comprising a set of spatial volume elements mapping a set of physical volume elements within a volume to be monitored, wherein each spatial volume element comprises attributes for the position and extension of the physical volume element, a velocity, density and an attenuation.

The inverting means generally solves the mathematical inversion problem of adapting a measured signal to a model that may comprise data from other sources. The model may in turn be displayed, for example, on a computer screen or on a printout on paper. In many instances, the inversion problem may be reduced to a linear inversion without loss of significant accuracy. Linear inversion problems may be solved by any of several techniques well known in the art.

The rock physical model makes it possible to include data from any relevant source in a relatively straight forward manner, and hence it decreases the uncertainties in the velocity models of prior art. For example, a core sample may reveal information on the composition of the formation such as layers of silt, clay, shale, limestone etc. and the depths of each layer. Any information obtained from the physical volume element may be represented in an attribute in the spatial volume element of the model. Moreover, triplets associating velocities with frequency and pressure as discussed in connection with FIGS. 1a-d in the introduction can be represented by an attribute of the spatial element module. Other parameters that may be included in the model comprise anisotropy, pore geometries, visco-elastic attenuation, fractures, dual-porosities, small scale cracks, mechanical and chemical compaction etc. These and other parameters can be obtained from lab measurements, well logs, core samples. Each parameter can be assigned a separate attribute in the spatial elements. Alternatively, a parameter's effect on the velocity- and attenuation values may be calculated, and the attributes for velocity and attenuation updated accordingly.

In a preferred embodiment, output data from the system are physically meaningful to a human operator. Thereby, the results may be assessed by the human operator or an expert without additional knowledge of any system specific output.

The spatial volume element may comprise other physical quantities relevant for adapting the mapping model to the microseismic data. For example, refractive indices might be useful in subsequent ray tracing algorithms to obtain travel-time tables. In particular, the rock physics model should account for effects such as different velocities for different frequencies, anisotropy, pore geometries, visco-elastic attenuation, fractures, dual-porosities, small scale cracks, mechanical and chemical compaction.

To account for anisotropy, any attribute may have a different magnitude in different directions. That is, physical variables may conveniently be represented by a vector, a tensor or some other attribute appropriate for the physical variable as well known in the art.

In a second aspect, the invention concerns a method for processing microseismic data using a rock physical model of the kind described comprising the steps of:
a) establishing the rock physical model of the formation;
b) acquiring rock physical data for the formation from the array of seismic sensors and any other available source;
c) updating the rock physical model with the acquired rock physical data and
d) repeating steps b) and c) throughout a monitoring period.

Step b) includes solving the mathematical inversion problem of matching a velocity model to observed seismic data.

In a preferred embodiment, the system outputs data in response to a request from the operator at any time during or after the monitoring period. Thereby, an expert may assess the model and, for example, pick one of several possible interpretations as being the most probable based on his or her experience, previous geological history of the formation etc. Accordingly, the rock physical model may be updated with input from an operator or expert.

Other features and advantages of the invention will become apparent from the appended claims and the following detailed description.

BRIEF DESCRIPTION OF THE DRAWINGS

The invention will be explained in greater detail by means of an exemplary embodiment and with reference to the accompanying drawings, in which.

DETAILED DESCRIPTION

Figure 3:
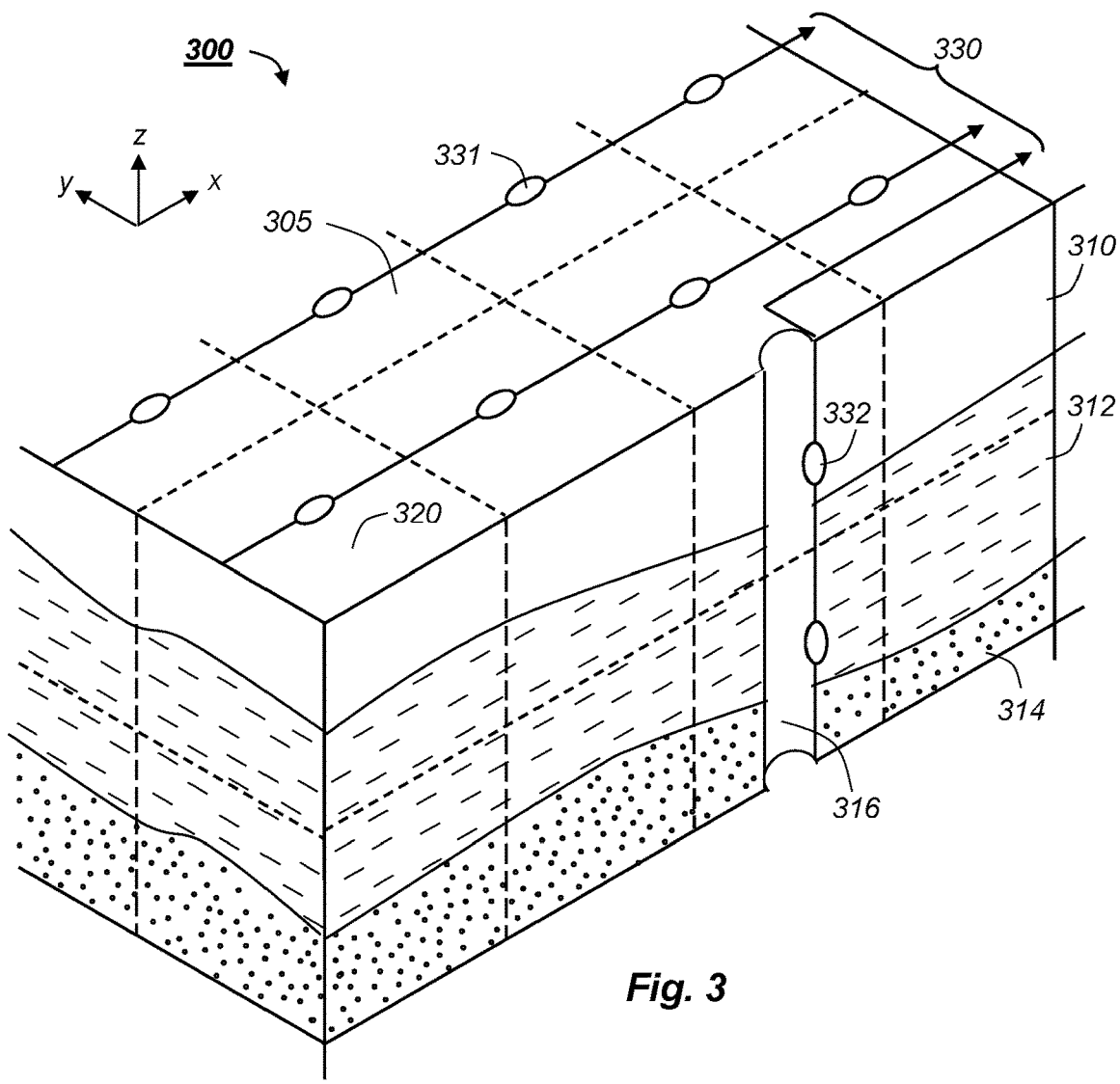
FIG. 3 illustrates a monitored volume.

FIG. 3 is a schematic illustration of a physical volume 300 to be monitored. The volume has a surface 305 that can be an ocean bottom offshore or dry land onshore. In either case, the medium above the surface 305 is a fluid, and does not convey S-waves. Hence, seismic nodes 331 containing seismic sensors are deployed in close contact with the surface 305 as discussed in the introduction.

The illustrated volume 300 comprises several layers 310, 312, 314 with different elastic properties. Of course, a real volume would not be limited to three layers. The volume 300 and the individual layers 310-314 are anisotropic. Physical volume elements 320 are depicted as cubical volumes separated by dotted lines. Thus, each physical volume element has a position in space and a spatial extension, for example represented by Cartesian coordinates x, y, z, and each physical volume element 320 is anisotropic. By the mean value theorem, a velocity can be found for each volume element 320 that represents the constituent velocities within the volume element 320. As the magnitudes would be different in different directions, a velocity vector might conveniently represent such an average velocity. Similar considerations apply to the attenuation 1/Q, and the resulting vectors would be different for P-waves and S-waves as noted with reference to FIG. 1. Next, it is readily seen that the spatial resolution of such a model depends on the size of the physical volume elements 320. That is, by dividing the monitored volume 300 into several volume elements 320, the spatial resolution is improved, and hence the value of microseismic monitoring is increased.

As well known in the art, volume elements may be regarded as anisotropic attenuating fields having an influx and an outflux, and in numerous other ways. Herein, velocity and attenuation should be regarded as an illustrative example. Thus, velocity and attenuation for a volume element can be determined by measurements or computation, for example depending on frequency, pressure, anisotropy, pore geometries, visco-elastic attenuation, fractures, dual-porosities, small scale cracks, mechanical and chemical compaction among others.

A set of physical volume elements may be regarded as a separate part for certain purposes. For example, lab measurements or computations for a series of volume elements may yield a composite travel time and attenuation from a receiver to a point B. Then, a well is drilled through B and a perforation shot fired at B. The seismic impulse may be regarded as a calibration shot as discussed above, and the relevant volume is the set of volume elements between the receiver and known position B. This set of elements may be regarded as a "super element" and stored in a rock physical mode as a separate entity. However, the preferred method would be to solve a mathematical inversion problem of matching the individual volume elements to the observed data. In the following, solving the inversion problem for a set of observed data may be referred to as "inverting the data" in accordance with common usage on the field.

Figure 1A:
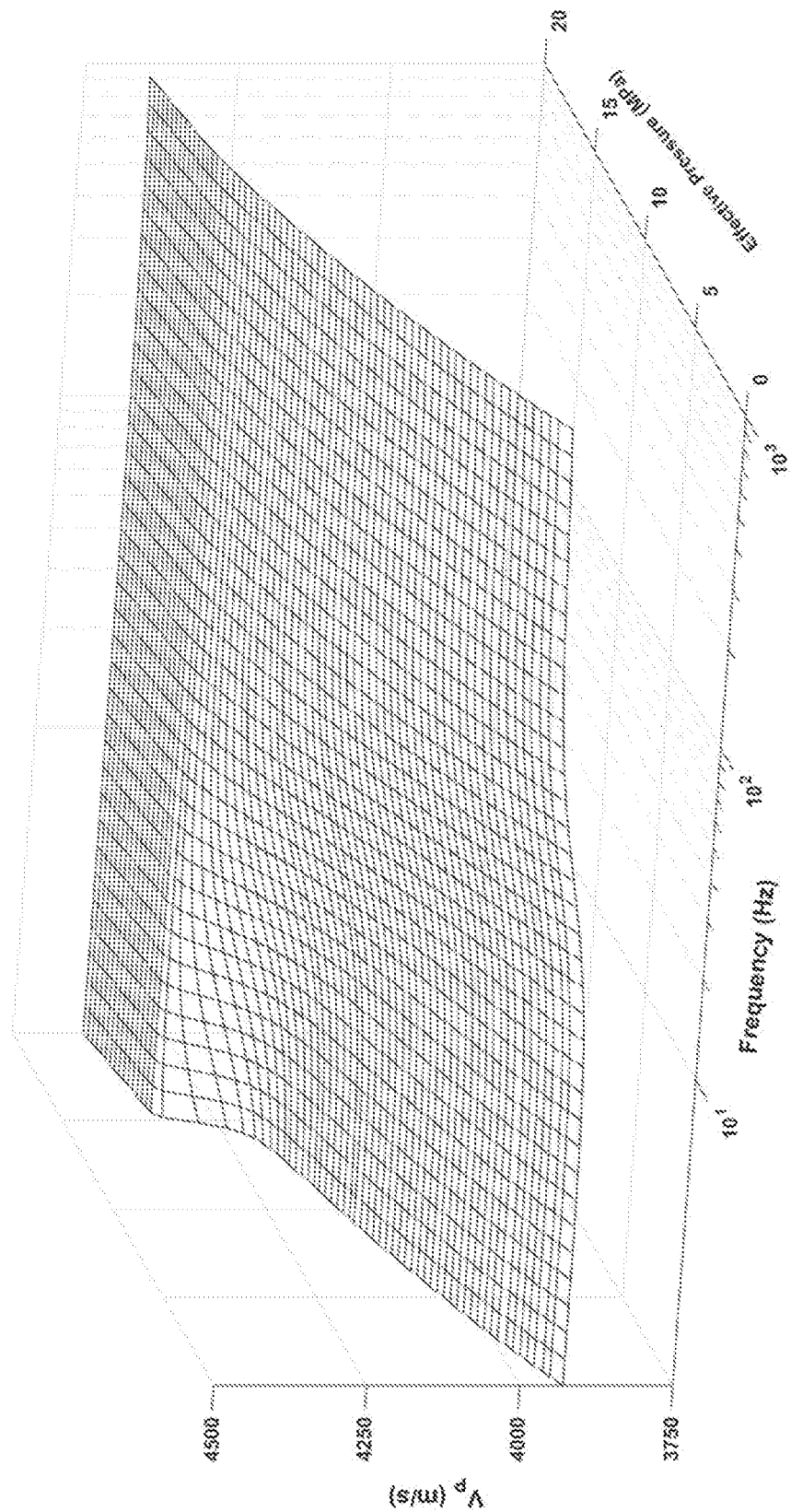
FIG. 1 illustrates velocities and attenuation as functions of frequency and pressure.
Figure 1B:
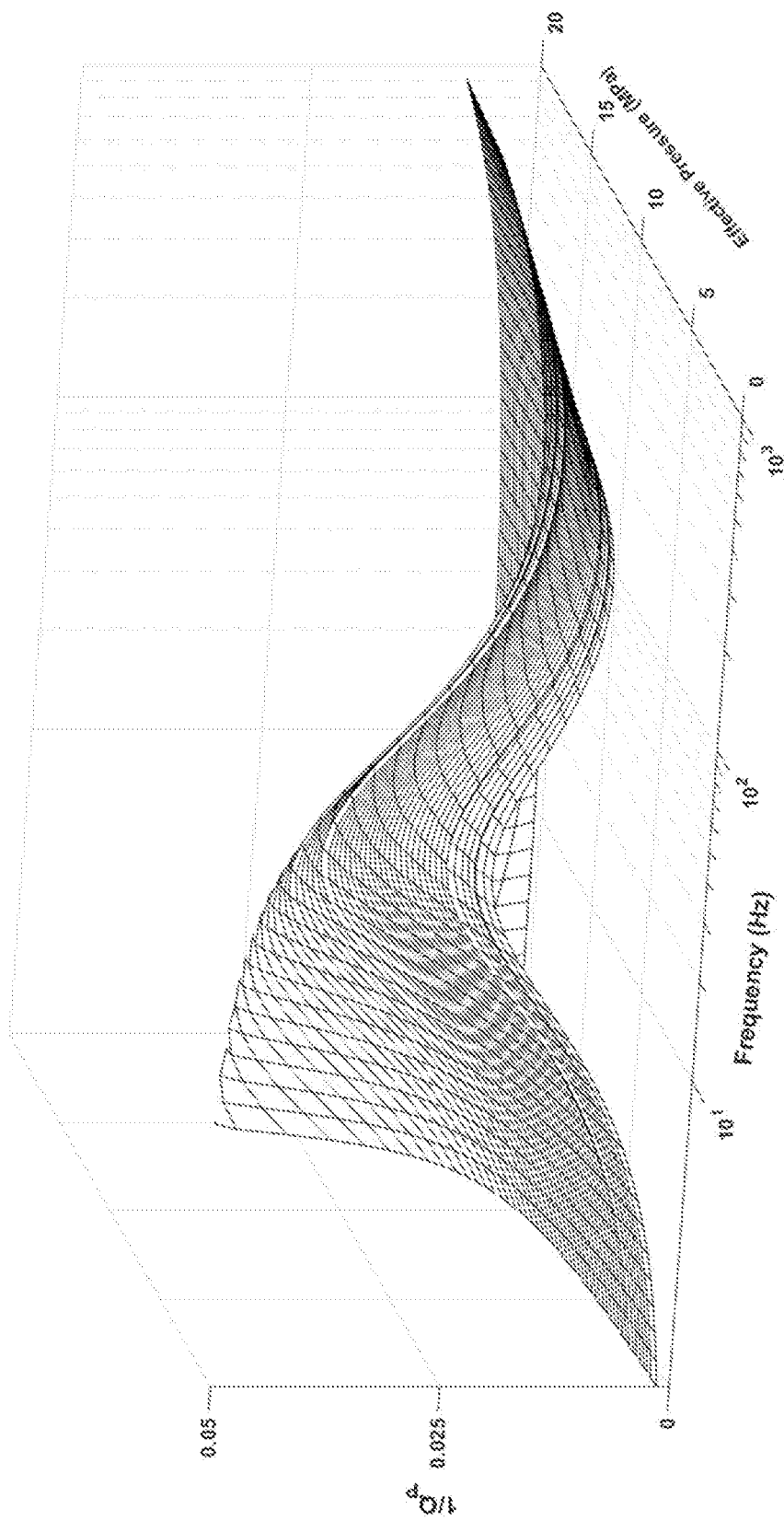
Figure 1C:
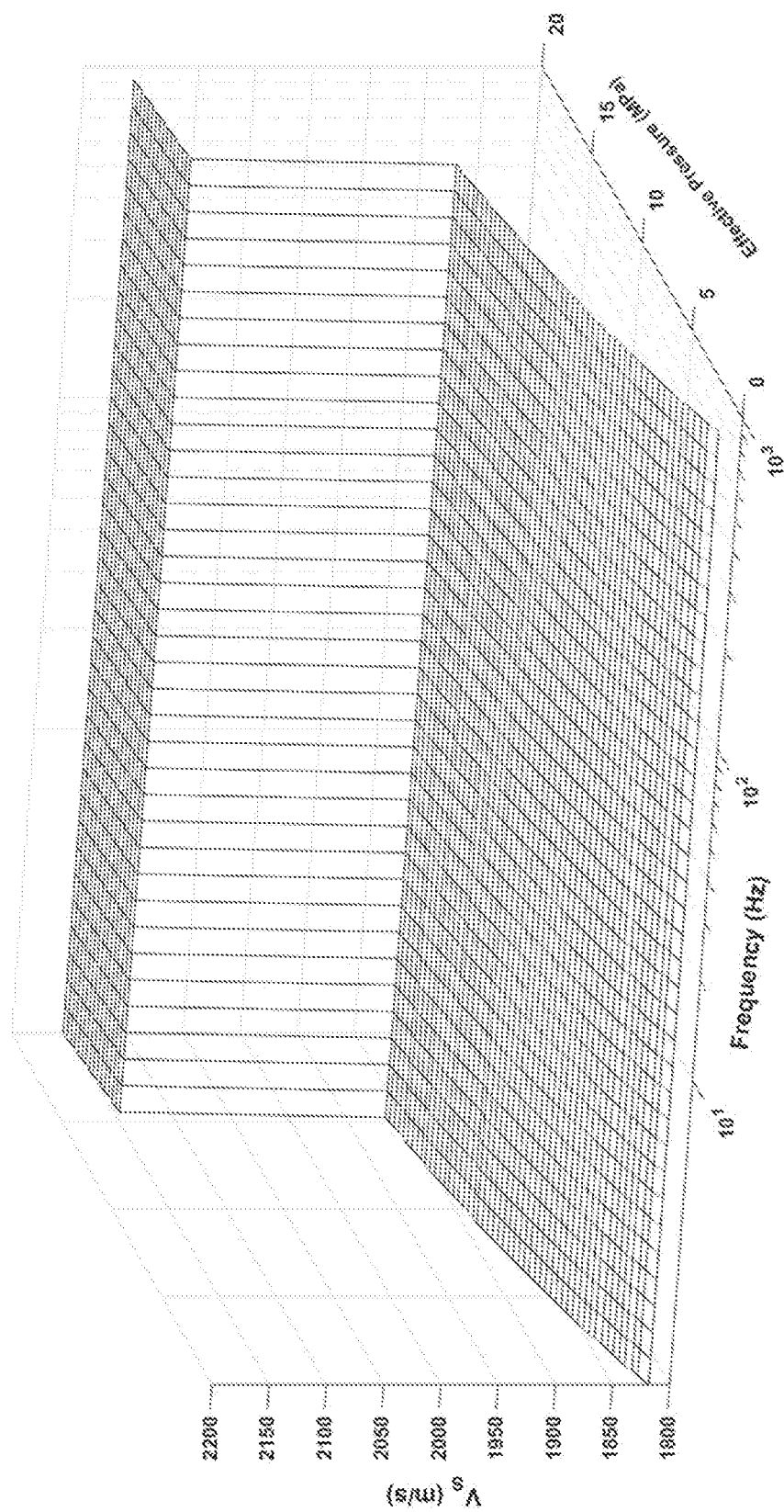
Figure 1D:
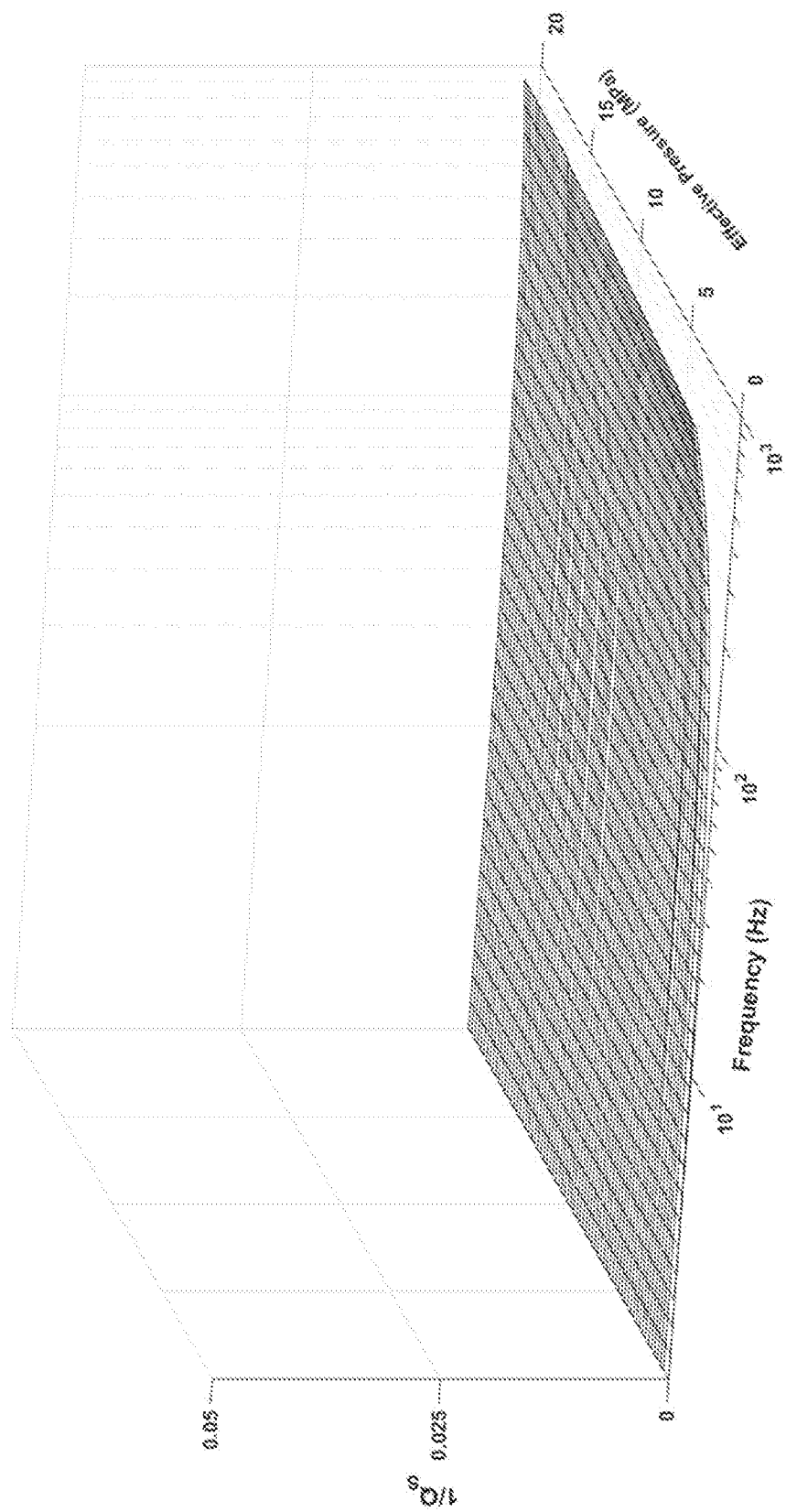
Figure 2:
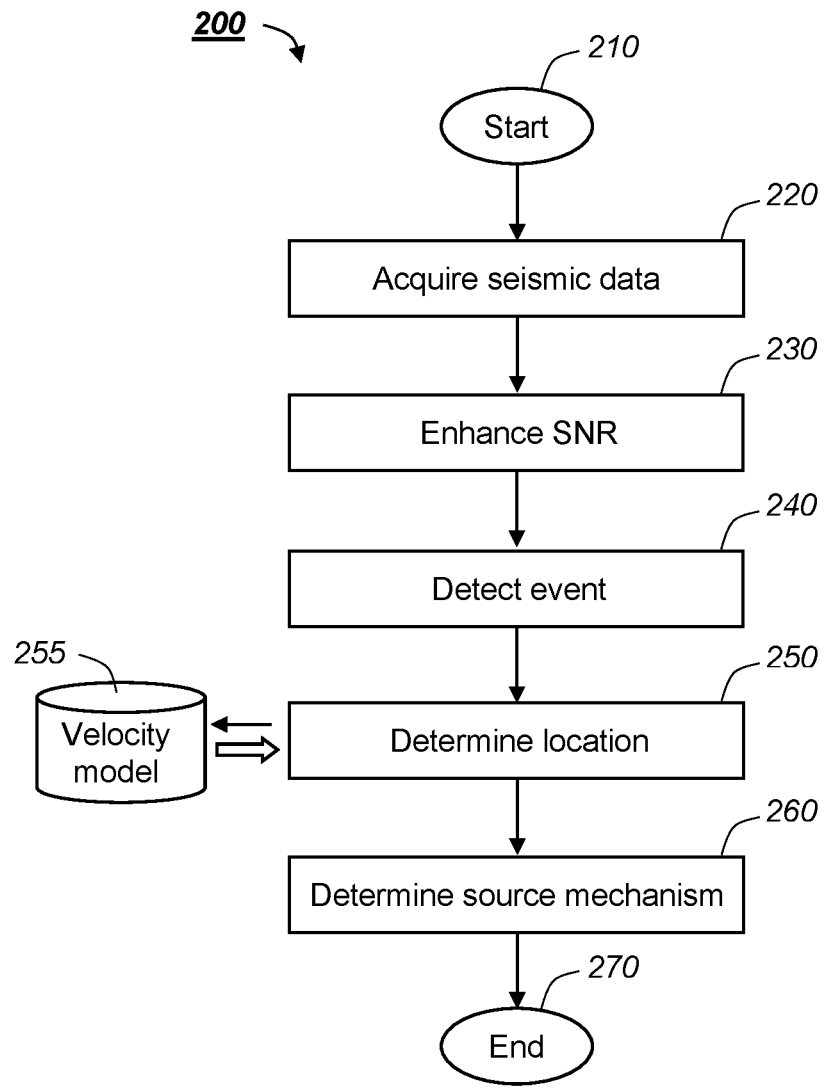
FIG. 2 is a flow diagram of a method according to the state of the art.

A wellbore 316 extends through the layers 310-314. As noted above, further seismic sensors 332 of the same kind as the sensors within the nodes 331 or of a different kind may be deployed within the wellbore 316. The seismic nodes 331 and/or 332 may comprise a control unit capable of initial signal processing as discussed with reference to FIG. 2. Signals from the sensors or receivers within the nodes 331 and/or 332 are conveyed through communication lines as shown by reference numeral 330. For simplicity, no clear distinction is made herein between the actual pattern of seismic nodes 331 and 332 and the set of communication lines conveying signals: Both are referred to as "sensor array 330". The distinction is nevertheless clear from the context, as the position of communication lines is obviously irrelevant and retrieving an array of nodes monitoring for microseismic events in order to obtain data would be impractical.

Figure 4:
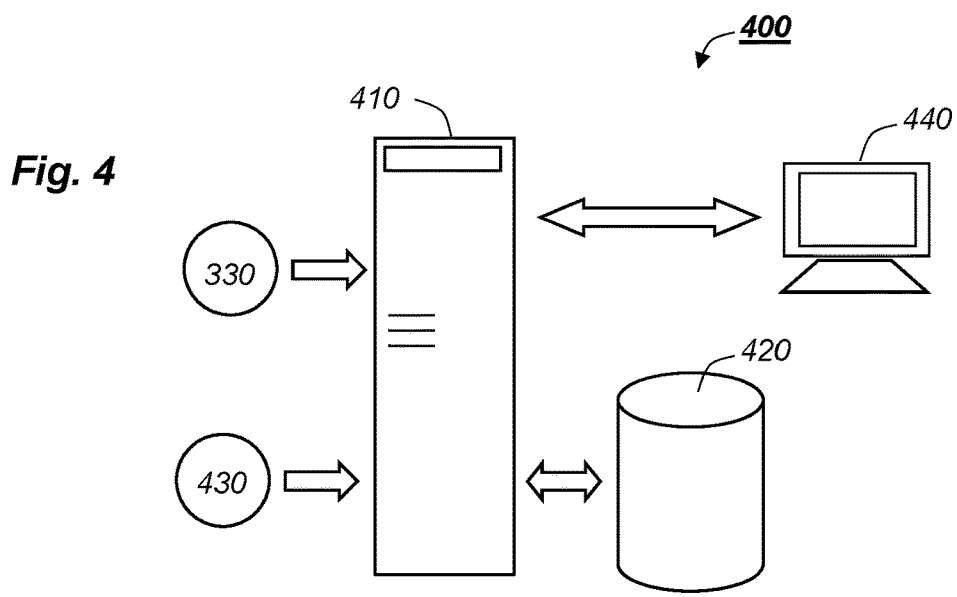
FIG. 4 illustrates a system according to the present invention.

FIG. 4 shows a system 400 that may be used for the present invention. As discussed above, input data may arrive from the sensor array 330 and any other source 430, such as lab measurements, core samples or seismic logs. A computer 410 is provided to run the inversion and other computational tasks. The exact computations depend, among other factors, on whether any signal processing were done by the nodes 331, 331 as discussed with reference to FIG. 2. As well known, the computer may comprise one or more special-purpose processors for e.g. graphical computation, vector computation, float number computations etc, and/or at least one general purpose CPU.

Disk 420 is any storage system, e.g. a redundant disk array, with sufficient I/O capacity to receive input from and provide output to the computer 410. The disk 420 stores the actual rock physical model. In accordance with the above, the rock physical model comprises a set of spatial volume elements, each corresponding to a physical volume element 320, e.g. as shown on FIG. 3. As used herein, the spatial volume element is a data structure comprising several attributes. Obviously, the absolute or relative position of the corresponding physical volume element is mandatory. Likewise, the extensions of the physical element along spatial axes, and thereby its orientation, is a mandatory attribute. In theory, different physical properties of the corresponding physical volume element might be stored as separate attributes in the data structure, and be used as input to a function whenever a velocity, travel time or attenuation would be required in an inversion. However, this would likely require too much computational resources and/or time to be practical. Still, the originally input, e.g. measured and/or computed values for pore densities, geometries, visco-elastic modules etc., might prove useful.

The parameters velocity and attenuation used in claim 1 are intended to represent variables that are directly useful in the inversion, and they may be measured directly or estimated from other parameters. They are mandatory attributes in the data structure termed the spatial volume element simply because they are frequently used in the computations. Hence, replacing velocities and attenuation with, for example, travel time values and/or Q-factors would depend on choice of representation and corresponding inversion, and thus be obvious to one skilled in the art.

In addition to the attributes frequently used for inversion and other computation, the rock physical model, i.e. the set of spatial volume elements, also comprises optional attributes for raw data, e.g. the elasticity modules, pore-densities, pore-geometries etc. mentioned above.

A workstation 440 is connected to the computer 410, and used to display results from the rock physical model. The results should preferably represent physically meaningful parameters, e.g. frequency spectra, plots similar to those shown in FIG. 1, a spatial representation of the monitored volume 300 etc. Thereby, a geophycisist or other expert would be able to assess the results without knowing special internal representations in the rock physical model. Based on his or her experience, history of the monitored volume and other factors, the expert may provide input to the model. For example, microseismic data that have several possible interpretations may be detected, i.e. such that the model and/or computer are unable to select the most likely microseismic event corresponding to the data. In such a case, an expert might be able to identify the most likely event from experience, history etc., and input the most likely alternative to the rock physical model. The double arrow between the computer 410 and the workstation 440 represents this general display and input.

Figure 5:
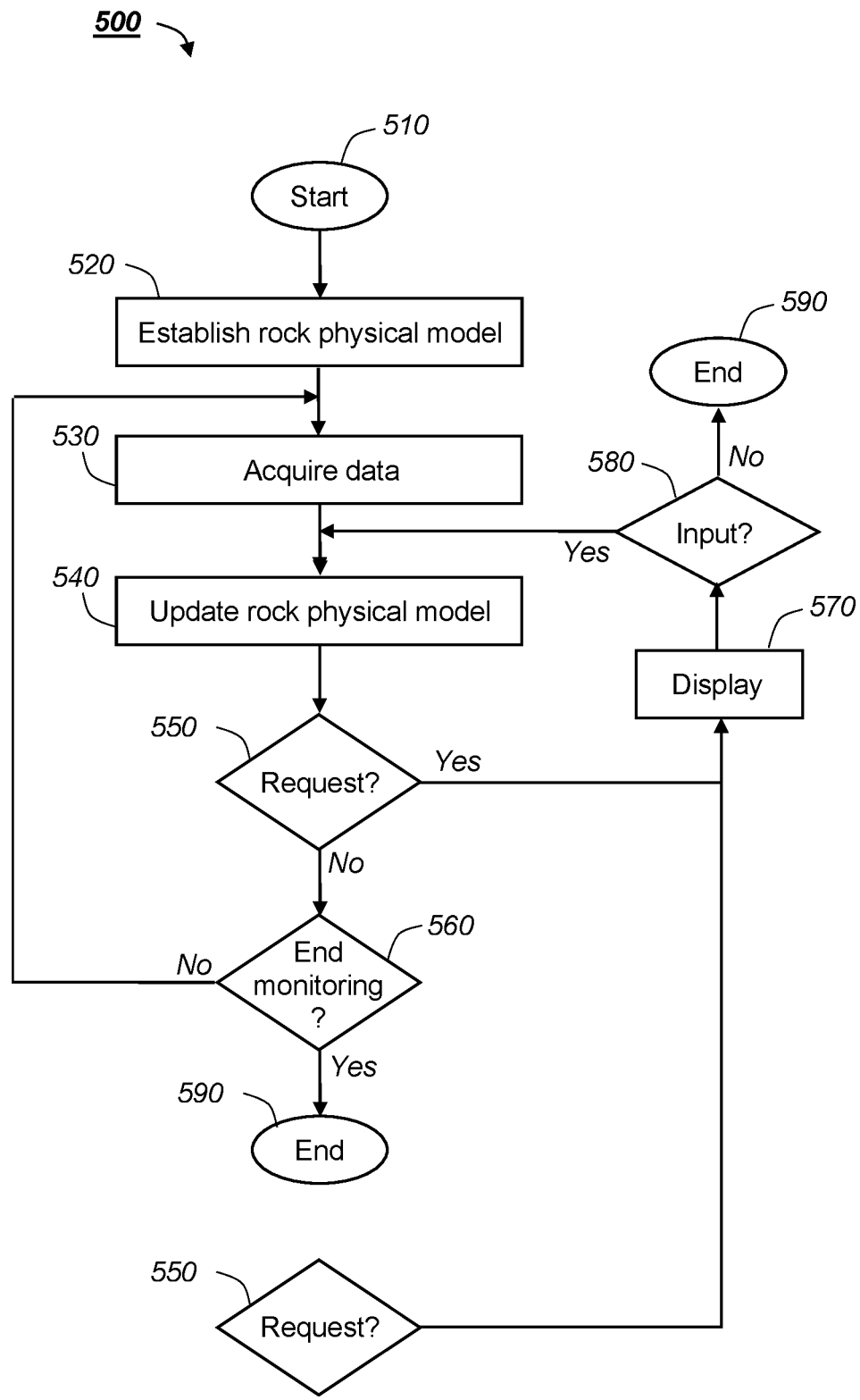
FIG. 5 is a flow diagram of a method according to the invention.

FIG. 5 is a flow chart illustrating a method 500 according to the present invention.

The method 500 starts in step 510, which may comprise any preliminary tasks, such as acquiring data for establishing a rock physical model.

In step 520, a rock physical model as discussed above is established.

In step 530, data is acquired from the seismic sensor array 330 and any other source 430. This step includes acquiring data on P- and S-waves, enhancing the SNR and detecting an event as described in connection with FIG. 2.

In step 540, the rock physical model is updated with results obtained from the acquired data. This step may comprise locating the microseismic event, estimating the magnitude of the microseismic event, inverting for event source mechanism and computing velocity and attenuation for the spatial volume elements based upon magnitude and source mechanism associated with the microseismic event. Thus, for example, a microseismic explosion may cause a crack that would be part of the rock physical model in the next iteration, in particular having an effect on velocities and attenuations in one or more spatial volume elements.

Test 550 determines if data should be displayed, e.g. upon request from an operator or if an expert evaluation is desired. If not, the process proceeds to test 560.

Test 560 determines whether monitoring should continue or not. For the duration of the monitoring period, the control returns to step 530, where data is acquired. Any pressure changes caused by detected microseismic events are recorded in the rock physical model, and are thus accounted for in the next iteration.

At the end of a monitoring period, the monitoring process ends at step 590. Still, the rock physical model may be accessed on request 550 from an operator.

If such a request 550 is received during or after the monitoring process, results are displayed for an operator or expert in step 570. The operator or expert may provide input to the rock physical model as described previously. This is illustrated by test 580. If input is provided, the rock physical model is updated. If no input is provided, the process ends at step 590.

While the invention has been described by way of example, the scope of the invention is determined by the appended claims.

REFERENCES

The following non-patent references are mentioned in the text above:

Agersborg, R., Jakobsen, M., Ruud, B. O., and Johansen, T. A., 2007, Effects of pore fluid pressure on the seismic response of a fractured carbonate reservoir. Stud. Geophys. Geod., 51 (2007), 89-118

Albright, J. N. and Hanold, R. J., 1976 Seismic mapping of hydraulic fractures made in basement rocks: Proceeding of energy research and development Administration (ERDA) Symposium on enhanced oil and gas recovery, 2, paper C-8

Chambers, K., Barkved, O., and Kendall, J-L., 2009, Imaging induced seismicity with the LoFS permanent surface array: Extended Abstract, SEG International Exposition and annual meeting 2009, 1612-1616.

Chambers, K., Kendall, J-M., and Barkved, O., 2010, Investigation of induced microseismicity at Valhall using the Life of Field Seismic array: The Leading Edge, March, 290-295.

Drew, J., Leslie, D, Armstrong, P. and Michaud, G. 2005, Automated microseismic event detection and location by continuous spatial mapping; Proceedings, Society of Petroleum Engineering Annual Technical Conference, Paper 95513.

Duncan, P. M. and Eisner, L., 2010, Reservoir characterization using surface microseismic monitoring: Geophysics, 75, A139-A146.

Gibiwicz, S. J. and Kijko, A., 1994, An introduction to mining seismology, Academic Press Inc.

Jansky, J., Plicka, V., and Eisner, L., 2013, Feasibility of jointly locating microseismic events with data from surface and downhole receivers: First Break, V. 31, 65-71.

Maxwell, S. C., Rutledge, J., Jones, R. and Fehler, M., 2010, Petroleum reservoir characterization using downhole microseismic monitoring: Geophysics, 75, A129-A137.

Rentch, S., Buske, S., Luth, S. and Shapiro, S. A., 2007, Fast location of seismicity: A migration-type approach with application to hydraulic-fracturing data: Geophysics, 72, no. 1, S33-S40.

Usher, P. J., Angus, D. A., and Verdon. J. P., 2013, Influence of velocity model and source frequency on microseismic waveforms: some implication for microseismic locations: Geophysical Prospecting, 2013, 61, 334-345.

The invention claimed is:

1. A method for passive microseismic monitoring of an underground formation comprising the steps of:
   providing a rock physical model of the underground formation in a computer, wherein the rock physical model comprises:
   a plurality of spatial volume elements,
   each spatial volume element comprises a mathematical representation of a corresponding physical volume element within the underground formation being monitored,
   each physical volume element having a known location in relation to each other physical volume element,
   each spatial volume element having a known location in relation to each other spatial volume element,
   each spatial volume element comprises attributes for the position and extension of the corresponding physical volume element,
   the attributes comprising mathematical representations of physical properties of the physical volume element, and
   rock physical data comprising velocities of S-waves and P-waves through the physical volume element calculated by the computer from the attributes, the calculated velocities for the P and S waves is dependent on frequency, and attenuation of the S-waves and P-waves in the physical volume element calculated by the computer from the attributes;
   continuously acquiring the P-waves and S-waves from a passive source within the underground formation by an array of seismic sensors at known locations above the underground formation;
   outputting a continuous seismic signal from the array of seismic sensors to the computer;
   enhancing, by the computer or the array of seismic sensors in real time, a signal-to-noise ratio (SNR) in the continuous seismic signal to form a continuous enhanced SNR seismic signal having reduced noise compared to the continuous seismic signal;
   a) detecting, by the computer in real time, a microseismic event in the continuous enhanced SNR seismic signal, the microseismic event being caused by a change in stress in the underground formation;
   b) identifying, by the computer in real time, microseismic data from the continuous enhanced SNR seismic signal representing the microseismic event;
   c) determining, by the computer in real time, a location of the microseismic event from the first microseismic data;
   d) estimating, by the computer in real time, a magnitude of the microseismic event from the microseismic data;
   e) inverting for event source mechanism and computing the velocity and the attenuation of the P waves and S waves through the spatial volume elements based upon magnitude and source mechanism associated with the microseismic event to form the rock physical data in real time;
   f) updating, by the computer in real time, the rock physical model with the rock physical data so that changes in the underground formation caused by the microseismic event are shown in the rock physical model; and repeating steps a) through f) until stopped, and
   presenting, by the computer, output data in response to a request from an operator at any time during and after a monitoring period, wherein the steps a) through f) are conducted solely using the passive source and without using an active source.

2. The system of claim 1, wherein output data from the system are physically meaningful to a human operator.

3. The method of claim 1, further comprising the step of presenting the output data from the system in response to a request from the operator at any time during and after the monitoring period.

4. The method of claim 1, wherein the step of updating the rock physical model includes updating with input from an operator.

5. The method of claim 1, wherein the spatial volume element comprises further physical attributes relevant for adapting the model to the microseismic data.

6. The method of claim 1, wherein an attribute has different magnitudes in different directions.

7. The method of claim 1, wherein the attributes comprise separate variables for P-waves and S-waves.

8. The method according to claim 1, wherein the formation is a hydrocarbon reservoir.

9. The method according to claim 1, further comprising repeating steps a) through f) for an additional microseismic event.

10. The method according to claim 1, wherein the formation is a geothermal site.

11. The method according to claim 1, wherein the calculated velocities for the P and S waves are dependent on effective pressure.

12. The method according to claim 1, wherein the attributes comprise a measurement of a physical property.

13. The method according to claim 1, wherein the attributes comprise a directional variable.

* * * * *